United States Patent [19]
Höfler

[11] 3,763,599
[45] Oct. 9, 1973

[54] APPARATUS FOR REGULATION OF CHIP REMOVAL IN TEETH-GENERATING GRINDING OF GEAR WHEELS

[76] Inventor: Willy Höfler, Fridtjof-Nansen Strasse 35, 75 Karlsruhe, Germany

[22] Filed: June 9, 1971

[21] Appl. No.: 151,380

[30] Foreign Application Priority Data
June 15, 1970 Germany.................. P 20 29 359.8
Mar. 24, 1971 Germany.................. P 21 14 151.5

[52] U.S. Cl................. 51/95 GH, 51/165.8, 51/232
[51] Int. Cl............................................ B24b 19/00
[58] Field of Search................. 51/123 G, 95, 165.8, 51/232

[56] References Cited
UNITED STATES PATENTS
| | | | |
|---|---|---|---|
| 1,896,752 | 2/1933 | Raule................................... | 51/232 |
| 2,061,778 | 11/1936 | Schicht................................ | 51/232 |
| 1,135,780 | 4/1915 | Drummond......................... | 51/123 G |
| 3,593,463 | 7/1971 | Uhterwoldt......................... | 51/165.8 |

*Primary Examiner*—Harold D. Whitehead
*Attorney*—Jennings Bailey, Jr.

[57] ABSTRACT

An intermittent tooth generating grinding machine for gear wheels has a bed and a table mounted for translational movement on the bed. Such translational movement is produced by turning a screw which is located completely outside the gear box and is driven therefrom by connecting gearing. The length of the screw, other than the portion mounted in its bearings and the driving gearing, is substantially equal to the translational movement of the table. The screw carries a nut. In one form, the screw is slidable on the bed between adjustable stop members and the nut is fixed to the table. In a second form, the screw is fixed on the bed, the stop members are fixed on the table and the nut is engaged between the stop members. In the third form, the screw is fixed on the table and the stop members on the bed and the nut moves between the stop members.

12 Claims, 8 Drawing Figures

INVENTOR
WILLY HOFLER
BY

APPARATUS FOR REGULATION OF CHIP REMOVAL IN TEETH-GENERATING GRINDING OF GEAR WHEELS

BACKGROUND OF THE INVENTION

1. Field of the Invention

This invention relates to apparatus for regulation of chip removal in intermittent tooth-generating grinding of gear wheels in which a table for the workpiece is operatively connected with a nut on a screw which is rotatable periodically in opposite directions for imparting to the workpiece table the translational component of translational and rotational components of the generating movement of the workpiece relative to a grinding wheel, and in which for regulation of chip removal the nut can execute an axial displacement limited by two adjustable stops.

2. The Prior Art

In such known apparatus the screw can execute an axial displacement, limited by the stops, for regulation of chip removal. The stops are provided on a spindle of the screw situated in the gearcase of the grinding machine and comprise bushings which are fast on the spindle of the screw and each of which bears with an annular face, through an interposed roller thrust bearing and an intermediate bushing, on a corresponding annular face of an adjusting bushing mounted on the spindle. Each adjusting bushing is movable along the spindle by means of a screw thread on the bushing in engagement with an internally threaded worm wheel seated on it concentrically with the spindle and bearing through a thrust bearing on an intermediate wall of the gearcase, the worm wheel meshing with an actuating worm therefor which is accessible from the exterior of the gearcase. Adjustment of the axial shift distance permitted to the rotatable screw is effected by operation of each worm to displace the associated adjusting bushing by the desired amount of infeed can be adjusted and read off from the respective position of the infeed worm separately for the left and the right tooth flanks to be ground. The two adjusting bushings are operative alternately, for limiting the axial displacement of the rotatable screw, according to the direction in which the workpiece table is being moved by the screw in the course of the periodic movement of the table back and forth.

A disadvantage of this known arrangement is the great difficulty in keeping indexing and transition errors within tolerable limits in the production of precision gear wheels. Thus, inter alia, the lack of precision of the flatness of the annular stop faces of the adjusting bushings at all adjusted positions thereof is a constant source of error. With a bushing which is moved along the screw spindle rotatably by screw threads, it is in fact not technically possible to obtain an accuracy of flatness of a few $\mu$ m on its annular stop surface for any desired angular positions of the bushing, even if the bushing is screwed into the internal thread of its worm wheel during the grinding of its annular face. Because of these errors of flatness, dependent upon the angular position of the adjusting bushing, in place of the entire annular stop face only a partial zone thereof comes into abutment with the intermediate bushing, so that the axial displacement thereof is determined not solely in accordance with the exactly reproducible rotating movement of the worm wheel, but also according to the uncontrollable error in flatness of the annular stop surface of the adjusting bushing.

A further source of error arises from the yieldability of the intermediate wall of the gearcase which has to absorb the high axial forces of the screw. For reasons of manufacturing technique the gearcase cannot be case on to the machine housing and therefore is greatly endangered by the periodical alternating thrusts of the axially shifting screw.

Another source of error lies in the gradual heating and consequential thermal expansion of the screw, which leads to variations in its length, with the result that, as with the other two sources of error abovementioned, differences of position of the workpiece table and thus of the tooth flanks to be ground occur in relation to the grinding wheel. Since the heating increases with the grinding time, this means that between the beginning and the end of the grinding a difference of position occurs which leads to transition errors between the tooth first ground and that last ground. The longer the grinding time, the greater does this transition error become, so that correspondingly great errors occur in the grinding of gear wheels with great tooth width.

Summary of the Invention

An object of the present invention is to provide improved apparatus of the kind initially mentioned, of substnatially improved accuracy especially in reducing the influence of the abovementioned sources of error. Another object is to accomplish such improvement with apparatus of simple and economic construction.

This invention accordingly consists in apparatus for regulation of chip removal in intermittent teeth-generating grinding of gear wheels in a grinding machine in which a table for the workpiece is operatively connected with a nut on a rotatable screw driven from a drive gearing which is housed in a gearcase of the machine and is adapted to rotate the screw periodically in opposite directions for imparting to the table the translational component of translational and rotational components of the generating movement of the workpiece relative to a grinding wheel, and in which for regulation of chip removal the nut is axially displaceable between limits determined by two adjustable stops which are arranged apart from the screw and on mountings independent of the gearcase, the length of the screw being dimensioned substantially according to the amplitude of the translational component, and the screw being arranged and mounted totally outside the gearcase and with a driving connection between the drive gearing and the screw.

In one form of the invention the nut is mounted on the workpiece table in fixed position relative thereto, while the stops are anchored on the machine bed in alignment with the ends of the screw which is mounted on the machine bed and is axially displaceable between the stops.

Alternatively, in a second form of the invention the nut may be mounted on the workpiece table so as to be axially displaceable relative thereto, the stops anchored on the workpiece table, and the screw mounted on the machine bed.

As a further alternative, in a third form of the invention the screw may be mounted on the workpiece table, the stops anchored on the machine bed, and the nut axially displaceable between the stops.

In the first and second mentioned forms of the invention the drive gearing (with its gearcase) for the screw is mounted on the machine bed, whereas in the third mentioned form the drive gearing and gearcase may be mounted on or attached to the workpiece table and thus take part in its translational movement.

With stops aligned and cooperating with the screw ends, the stops have only a relatively slight radial extent, so that unavoidable errors of flatness of the stops can have no appreciable effect, while with stops arranged to cooperate with the nut the problem of errors of flatness is completely excluded, because flatness between the stops and the nut is not important. While in the second and third mentioned forms of the invention axial displacement of the nut is limited directly by the stops, in the first mentioned form of the invention this is effected indirectly through the axial displaceability of the screw.

Since in this invention the anchoring of the stops is independent of the relatively yieldable gearcase, being effected on the substantially more stable machine bed or workpiece table, yielding of the stops under the axial force exerted alternately upon them is avoided. Also, with the arrangement of the screw totally outside the gearcase, so that it no longer needs to be extended into the drive gearing but is driven therefrom by an intermediate driving connection such as an intermediate wheel arranged outside the gearcase, the length of the screw and correspondingly the error-producing variation in length thereof due to heating can be reduced substantially, in practice to be only approximately half as great as in the prior art arrangement. The transition error introduced by such additional intermediate wheel is of inconsequential effect since it is converted by the nut into a translational movement with a reduction of 40:1 in practice; that is to say, if a total indexing error of 10 $\mu$m is tolerated, an error of only ¼ m occurs in the translational movement of the workpiece table. Since in generating grinding machines for the grinding of large gear wheels the screw may be up to 5 meters in length, the substantial shortening of the screw effected in this invention also reduces the risk of the screws sagging under its own weight or as a result of the axial force acting on it.

Individual adjustment of each stop may be effected by means of a worm-actuated worm wheel turning the stop which has an external screw thread engaged in a fixed stand. Alternatively, the adjustment may be effected by means of a spring-loaded wedge which is displaceable along a counter-piece in an oblique direction relative to the axis of the stop. The wedge may be displaceable by means of a worm-actuated worm wheel turning a member engaging the wedge which has an external screw thread engaged in a fixed stand.

The stops may be formed as bolts with domed abutment faces, and, when the stops cooperate with the ends of the screw as above described, the two end faces of the screw preferably are provided with hardened inserts. These measures further reduce the effect of errors of flatness of the stops when their adjustment is effected by a worm wheel and screw threading as above mentioned.

It is advantageous to provide for each stop an associated displacement pickup having a feeler member engaging the stop for sensing the displacement thereof, each pickup being connected to an individual indicator for indicating the adjusted position of the associated stop, and both pickups being connected to a differential indicator for indicating any differential which may occur between the adjusted positions of the stops.

BRIEF DESCRIPTION OF THE DRAWINGS

The invention is explained further below by reference to embodiments illustrated as examples. In the accompanying drawings.

DESCRIPTION OF THE PREFERRED EMBODIMENTS

Corresponding parts in the various Figures are denoted by the same reference numerals.

Figures 1, 2:
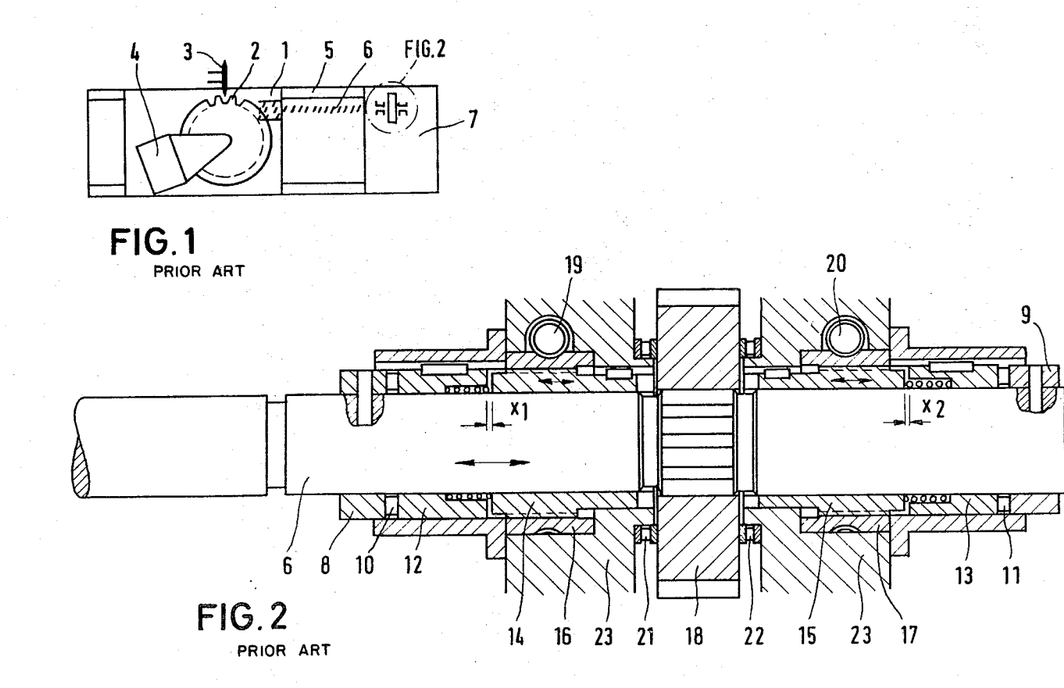
FIG. 1 is a diagrammatic plan representation of the prior art form of workpiece table drive of a gear generating grinding machine.
FIG. 2 is a section on a larger scale of the portion of FIG. 1 marked "FIG. 2" and shows the prior art arrangement of stops for the limitation of the axial displacement of the screw.

Referring to FIG. 1, a gear generating grinding machine has a workpiece table 1 for carrying a gear wheel workpiece 2 to be ground and which is caused to execute in each case a generating movement relative to a grinding wheel 3. The workpiece 2 is secured to the table 1 by means of a clamp 4. The workpiece table 1 is displaceable rectilinearly on longitudinal guides 5 to impart a translational component of the generating movement to the workpiece 2. The displacement of the workpiece table is effected by a screw 6 engaged in a nut 6' carried by the table 1, the screw being rotatably driven periodically in the mathematically positive and negative directions of rotation, from a crank gearing situated in a gearcase 7 arranged on the machine bed. The production of a rotational component of the generating movement of the workpiece is effected in the usual manner through pitch blocks or through pitch change wheels.

To allow an infeed movement of the workpiece relative to the grinding wheel during the grinding of the gear wheel, it is usual to vary the association between the rotational and translational components of movement of the workpiece. When pitch change wheels are used for the generation of the rotational component, this variation can be effected for example by permitting the screw a predetermined and adjustable free stroke in the axial direction so that the tooth flank to be ground is pivoted towards the grinding wheel face, without a corresponding displacement of the workpiece table taking place, until the free stroke for the axial displacement of the screw is completed.

The prior art arrangement of stops for the limitation of the axial displacement of the screw is shown in FIG.

2. On the spindle end portion of the screw 6 which extends into the gearcase 7 are fixed sleeves or collars 8 and 9 axially spaced part and bearing through roller thrust bearings 10 and 11 on intermediate bushings 12 and 13 on the spindle, respectively. The bushings 12 and 13 are each non-rotatably but axially displaceably mounted in a housing wall and bear respectively on adjusting bushines 14 and 15 on the spindle which constitute the actual stops. Bushings 14 and 15 are non-rotatably mounted but are movable axially on the spindle by a screw thread provided on their external cylindrical surfaces engaging an internal screw thread in worm wheels 16 and 17 which are rotatable by means of worms 19 and 20 accessible from the outside of the gearcase 7. The screw 6 is driven by the crank gearing in gearcase 7 through a gear wheel 18 which is splined on the screw spindle to permit relative axial displacement between the gear wheel and the spindle. Gear wheel 18 bears through thrust bearings 21 and 22 on the housing 23.

Thus by turning the worms 19 and 20 the play between the clamp sleeves 8 and 9 and the adjusting bushings 14 and 15 can be adjusted. As a result of this play, on a reversal of rotation of the gear wheel 18 by the crank gearing, first an axial movement of the screw 6 takes place, while the screw turns in the nut and workpiece table 1 remains at rest because of its substantially greater inertia to changes of movement, until engagement of collar 8 or 9 with bushing 14 or 15 blocks further axial displacement of the screw 6 after which continued rotation of the screw results in movement of the table 5. Therefore the desired amount of infeed ($x_1$ or $x_2$) can be adjusted separately for each tooth flank by means of the two worm wheels 16 and 17.

Figure 3:
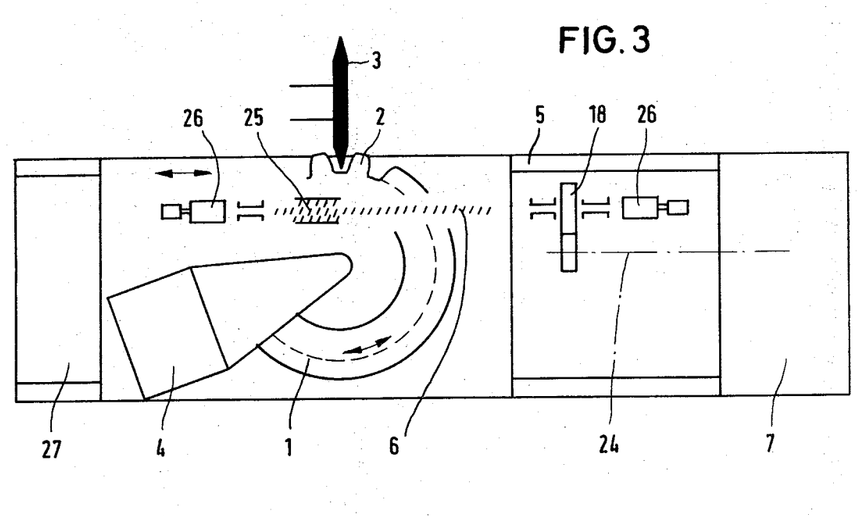
FIG. 3 is a diagrammatic plan representation, corresponding to FIG. 1, but of a workpiece table drive according to one embodiment of the invention.
Figure 4:
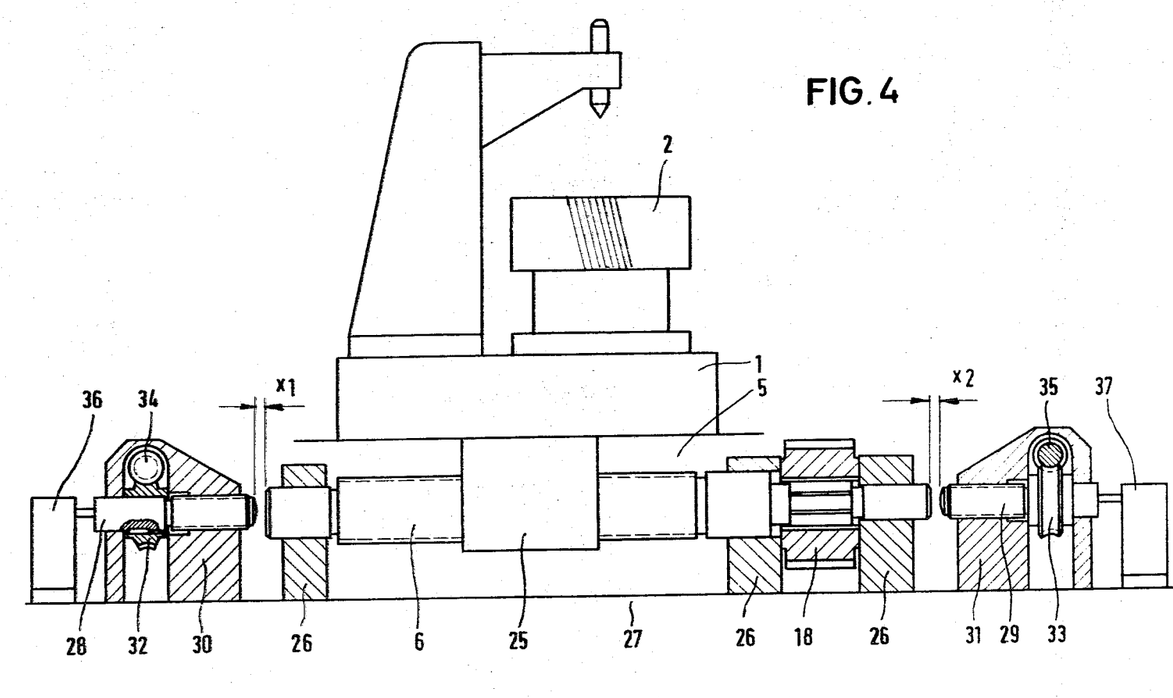
FIG. 4 is a side elevation, partially in section, of the drive arrangement according to FIG. 3 shown on a larger scale.

In FIGS. 3 and 4 a drive arrangement according to the invention is illustrated, according to which the drive of the gear wheel 18 and thus of the screw 6, which turns in nut 25, takes place, not within the gearcase 7 as in FIG. 2, but at a location outside the gearcase by means of a shaft 24 (FIG. 3) protruding from the gearcase, and carrying a gear meshing with gear 18, so that the screw 6 is now shortened substantially. As FIG. 4 shows, the adjustable stop members for the limitation of the axial displacement of the screw 6 are separate from the screw 6 and are constituted by bolts 28 and 29 threadedly mounted in alignment with the ends of the screw 6 in housings 30 and 31 which are anchored by bolts on the machine bed 27 to which the radial bearings 26 of the screw 6 are also secured. The bolts 28 and 29 are turned and thus axially displaced in their housings by means of worm wheels 32, 33 and actuating worms 34, 35 for the worm wheels. Stops 28 and 29 are keyed to worm wheels 32 and 33 so as to be slidable but non-rotatable with respect thereto. The ends of the bolts which face the ends of screw 6 are provided with domed abutment faces in order to reduce to a minimum the errors of flatness of those faces over the range of adjustment of the bolts 28 and 29.

Figure 7:
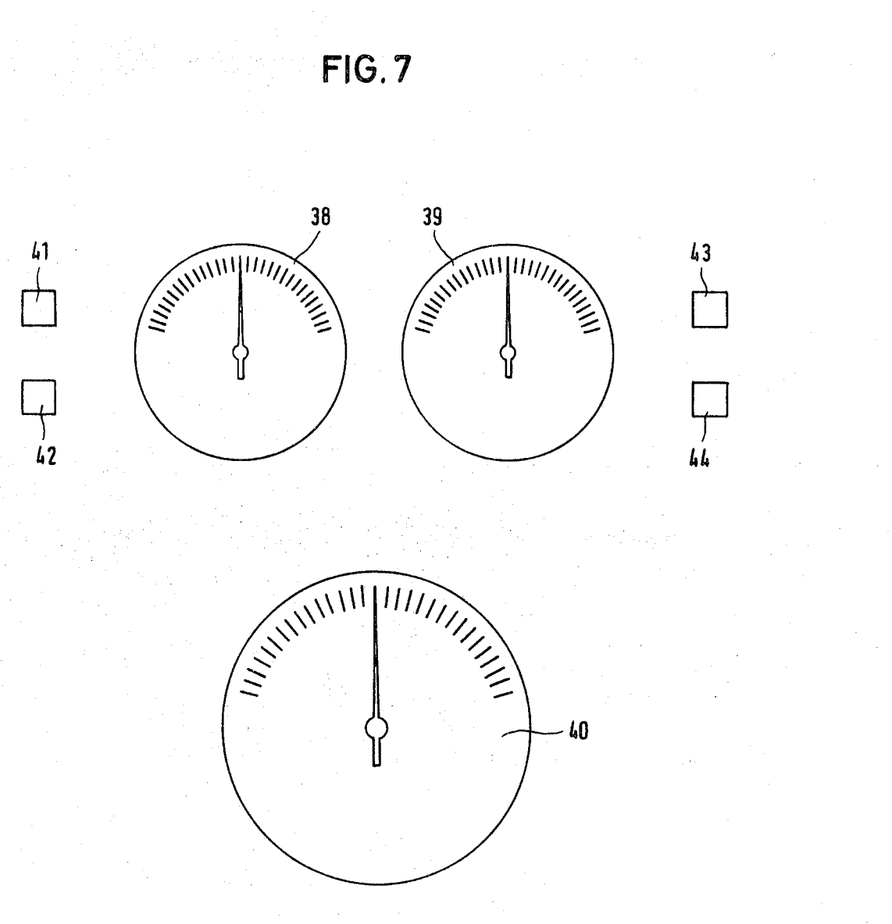
FIG. 7 is a diagram of the indication of the cutting infeed.

Since the axial displacements of the bolts 28 and 29 correspond with the amounts of infeed on the respective tooth flanks, electric pickups 36, 37 are arranged to sense the adjusting movements of the bolts 28 and 29 respectively and to transmit signals responsively to indicator instruments 38, 39 and 40 depicted in FIG. 7. In this case each of the two instruments 38 and 39 is connected in circuit with one of the pickups to indicate the amount of infeed separately for each tooth flank, while the instrument 40 is of a differential type connected in circuit with both pickups to indicate any differences of the amounts of infeed between the one tooth flank and the other, so that symmetrical grinding of a tooth gap is facilitated.

The infeed may be effected by motor means, and push buttons 41 to 44 are provided for switching on and off and reversing the direction of rotation of two infeed motors (not shown) driving the worms 34 and 35 respectively.

Figure 5:
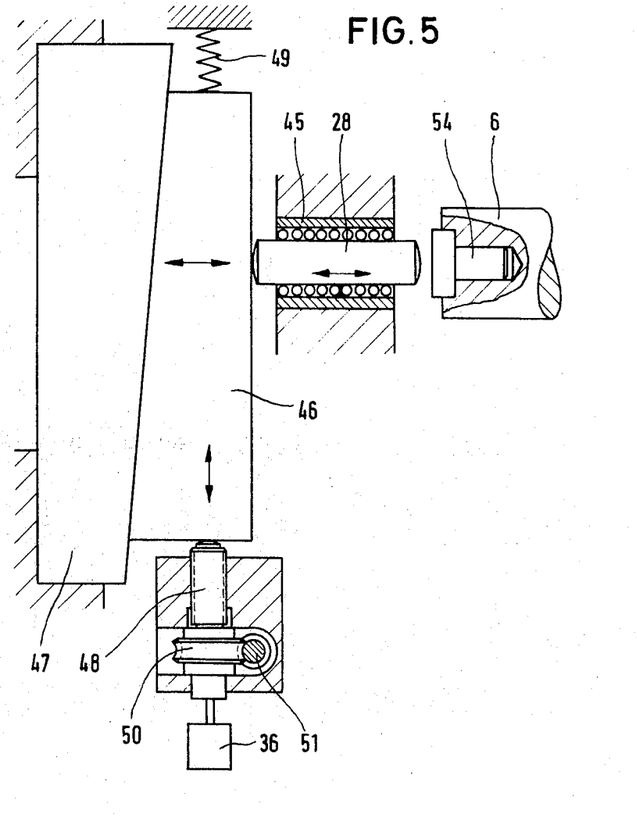
FIG. 5 shows a modification of the stop adjusting means shown in FIG. 4.

In a modification shown in FIG. 5 for the control of the stops 28' and 29', the actuation of the bolt 28' (or 29') which is guided in a sleeve bearing 45 is effected by means of a wedge 46 which slides along a counterpiece 47 and is displaceable by an infeed bolt 48 against the action of a spring 49. The infeed bolt 48 is displaceable in the manner as already described by rotation of a worm 51 and a worm wheel 50. The associated pickup 36' (or 37') is in this case arranged to sense the adjusting movements of the infeed bolt 48.

To reduce wear, a hardened, ground and very finely lapped insert 54 is secured in each end face of the screw 6. The domed abutment face of each of the bolts 28' and 29' is likewise hardened and lapped.

Figure 6:
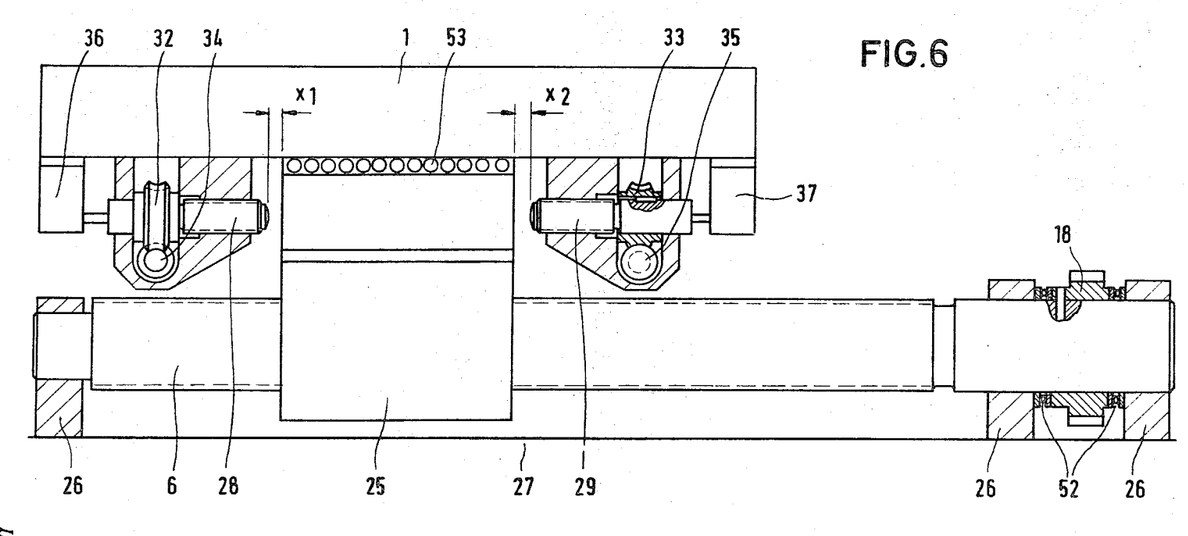
FIG. 6 shows a second embodiment of the invention depicted in a manner corresponding to FIG. 4.

In the embodiment of the invention depicted in FIG. 6, regulation of chip removal is effected not by axial displacement of the nut by means of an axially displaceable screw, but by axial mobility of the nut 25 relative to the workpiece table 1. In FIG. 6 the screw 6 is mounted with radial bearings 26 which are secured on the machine bed 27, and the screw is secured against axial displacement by a double-acting thrust bearing 52. The cooperating nut 25' is axially displaceably mounted in longitudinal guides 53 on the workpiece table 1, its axial mobility being limited by stop bolts 28 and 29 of the nature already described, with which electric pickups 36 and 37 are associated as before for indicating the adjustments of the stops. In this embodiment, however, the bolts 28, 29 and pickups 36, 37 are secured to the workpiece table 1. The screw 6 is driven through the gear wheel 18, and upon reversal of rotation, as a result of the inertia of the workpiece table 1, the nut 25 applies itself against the abutment face of the bolt 28 or 29 according to the direction of rotation of the screw.

Figure 8:
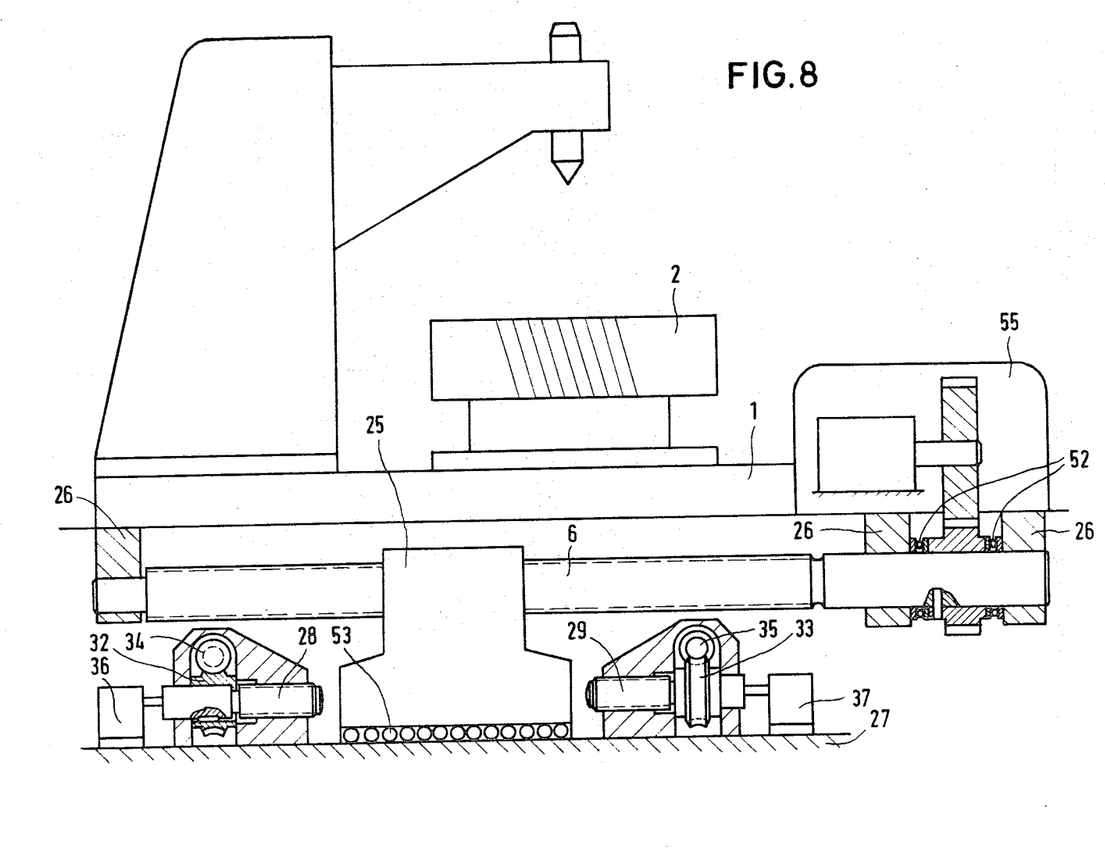
FIG. 8 shows a third embodiment of the invention, again depicted in a manner corresponding to FIG. 4.

In FIG. 8 an embodiment of the invention is illustrated which may be regarded as a reversal of the arrangement according to FIG. 6. In FIG. 8 the screw 6 is mounted on the workpiece table 1 with radial bearings 26 and axial thrust bearings 52, while the nut 25 is axially displaceable between stop bolts 28 and 29 which are mounted in housings secured on the machine bed 27. The guidance of the nut 25 relative to the machine bed 27 is effected through longitudinal guides 52.

The embodiment of FIG. 8 additionally has the advantage that a drive gearing 55 for the screw 6 can be arranged on the workpiece table 1 in direct driving connection with the screw 6, thereby allowing elimination of an interposed drive shaft such as is designated by 24 in FIG. 3. This, besides simplifying the construction, also more especially involves a further exclusion of transmission errors.

In other respects the explanations regarding FIGS. 3, 4 and 6 are applicable correspondingly for FIG. 8.

It will be apparent that, in the form of FIG. 4, the screw part 6 is mounted on the bed part and the stop members are likewise mounted on the bed part for limiting movement of the screw part with respect to the bed part, while the nut part is secured to the table part.

In the form of FIG. 6, the screw part is fixed on the bed part and the stop members are fixed on the table part, where they limit the movement of the nut part.

In the form of FIG. 8, the screw part is fixed on the table part and the adjustable stop members are on the bed part where they limit the movement of the nut part.

I claim:

1. In an intermittent tooth-generating grinding machine for gear wheels having a bed part and a table part and means mounting the table part for translational movement with respect to the bed part, a screw element, means mounting the screw element on one of said bed and table parts for turning movement with respect to such part, a nut element threadedly engaged on said screw element, and a pair of adjustable stop members mounted on one of the table and bed parts in the path of movement of one of the screw and nut elements for limiting movement of such element with respect to the part on which the stop members are mounted, one of the screw and nut elements being fixed to one of the bed and table parts and the other of the elements being movable between the stop members for engagement therewith, means fixedly holding the nut element nonrotatably about the axis of the screw element, whereby turning of the screw element produces movement of one of the screw and nut elements when such element is out of engagement with the stop members without producing movement of the table and produces movement of the table after such engagement, a gearcase including gearing carried by one of the bed and table parts, said screw element being located completely outside the gearcase, and means operatively connecting the screw element to the gearing to be driven thereby alternately in opposite directions, said gearcase being mounted on the other of the bed and table parts from that on which the stop members are mounted.

2. In a machine as claimed in claim 1, the screw part being mounted on the bed part for axial movement with respect thereto, the stop members being mounted on the bed part and limiting such movement of the screw part, and the nut part being fixed to the table part.

3. In a machine as claimed in claim 2, the ends of the screw having hardened inserts therein engageable with the stop members.

4. In a machine as claimed in claim 1, the stop members comprising housings fixed to one of the bed and table parts having bores therein, stop parts threaded in said bores, and worm wheel operated means for turning said stop members.

5. In a machine as claimed in claim 4, said stop parts having domed ends facing the part whose movement is limited thereby.

6. In a machine as claimed in claim 1, said adjustable stop members including stop parts having domed ends facing the part whose movement is limited thereby.

7. In a machine as claimed in claim 1, said screw part being mounted on the base part and said stop members being mounted on the table part and limiting the movement of the nut part with respect to the table part.

8. In a machine as claimed in claim 1, said screw part being mounted on the table part and said stop members being mounted on the base part for limiting the movement of the nut part with respect to the base part.

9. In a machine as claimed in claim 1, bearings mounting the ends of the screw part, the length of the screw part being substantially no greater than the sum of the length of the bearings, the connecting means to the gearing and the translational movement of the table part.

10. In a machine as claimed in claim 1, said adjustable stop members each comprising a stop part mounted for movement towards and from the part whose movement it limits, a wedge operatively engageable with the stop part to produce movements towards such part, said wedge being mounted for movement transversely with respect to the direction of movement of the stop part, and spring means acting on the wedge to move it in one direction.

11. In a machine as claimed in claim 10, means to move the wedge in the other direction comprising a member engageable with the wedge, a fixed housing, having a bore therein, said member being threaded in said bore, and worm wheel means to produce turning of the member.

12. In a machine as claimed in claim 1, each stop member having associated therewith a displacement pickup having a feeler member engaging the stop member for sensing the displacement thereof, each pickup being connected to an individual indicator for indicating the adjusted position of the associated stop, and both pickups being connected to a differential indicator for indicating any differential occurring between the adjusted positions of the stops.

* * * * *